United States Patent

Butka

[11] Patent Number: 5,410,198
[45] Date of Patent: Apr. 25, 1995

[54] PROPULSION SYSTEM

[76] Inventor: Kemal Butka, 372 Central Park West, New York, N.Y. 10025

[21] Appl. No.: 100,548

[22] Filed: Jul. 30, 1993

[51] Int. Cl.6 ............................................ H02K 44/00
[52] U.S. Cl. ...................................................... 310/11
[58] Field of Search .............................. 310/11; 417/50

[56] References Cited

U.S. PATENT DOCUMENTS 5,111,087  5/1992  Butka ...................................... 310/11

FOREIGN PATENT DOCUMENTS 0126153   5/1989  Japan ...................................... 310/11
2294260  12/1990  Japan ...................................... 310/11
4113656   5/1992  Japan ...................................... 310/11

*Primary Examiner*—Steven L. Stephan
*Assistant Examiner*—Judson H. Jones
*Attorney, Agent, or Firm*—Michael J. Striker

[57] ABSTRACT

A propulsion system has a substantially tubular housing having an axis, an element generating an electric current, an element generating a magnetic field substantially perpendicular to the electric current, an element forming a duct extending around the axis and arranged so that by interaction of the magnetic field and the electric current a force in a liquid accommodated in the duct is produced and the liquid is moved in the duct around the axis, and at least one insert located in the duct and fixedly connected to a part so that when the liquid is moved it applies a thrust against the insert in a direction around the axis so as to turn the insert and therefore the part around the axis to produce a rotary force which rotates the part around the axis.

9 Claims, 5 Drawing Sheets

# PROPULSION SYSTEM

BACKGROUND OF THE INVENTION

The present invention relates generally to propulsion systems and more particularly to magnetohydrodynamic propulsion systems.

Propulsion systems of the above-mentioned type have been developed relatively recently, in particular in the United States, the Soviet Union and Japan. The known magnetohydrodynamic propulsion system involves an interaction of magnetic fields and fluids that conduct electricity. In a known magnetohydrodynamic propulsion system a pair of electrodes on either side of the thruster pass an electric current through for example sea water. At a right angle to the current is the magnetic field generated by the superconducting magnet. The interaction of the magnetic field and the current produces a strong force on the water, so that the water is moved through the duct in the center of the magnet. In known magnetohydrodynamic propulsion systems the system is open so that the water continuously or periodically enters the system and exits to produce a respective force.

My U.S. Pat. No. 5,111,087 discloses a new propulsion system in which for the propulsion of a liquid applying a thrust, a closed duct is formed so that the liquid circulates inside the system and does not escape from it. The duct can be connected with a vehicle so as to transfer the thrust to the vehicle. The propulsion system disclosed in this patent is used for propulsion of vehicles in a longitudinal propulsion direction. It is believed to be clear that it is advisable to further improve and modify the existing propulsion systems of this type.

SUMMARY OF THE INVENTION

Accordingly, it is an object of the present invention to provide a propulsion system which is a further modification of my propulsion system disclosed in U.S. Pat. No. 5,111,087.

In keeping with these objects and with others which will become apparent hereinafter, one feature of the present invention resides, briefly stated, in a propulsion system which comprises a substantially tubular housing having an axis, means generating an electric current, means generating a magnetic field substantially perpendicular to the electric current, means forming a duct extending around the axis and arranged so that by interaction of the magnetic field and the electric current a force in a liquid accommodated in the duct is produced and the liquid is moved in the duct around the axis, and at least one insert located in the duct and fixedly connected to the housing so that when the liquid is moved it applies a thrust against the insert in a direction around the axis so as to turn the insert and therefore a part of the system around the axis to produce a rotary force which rotates the part around the axis. This rotary movement can be transmitted to an outside object.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
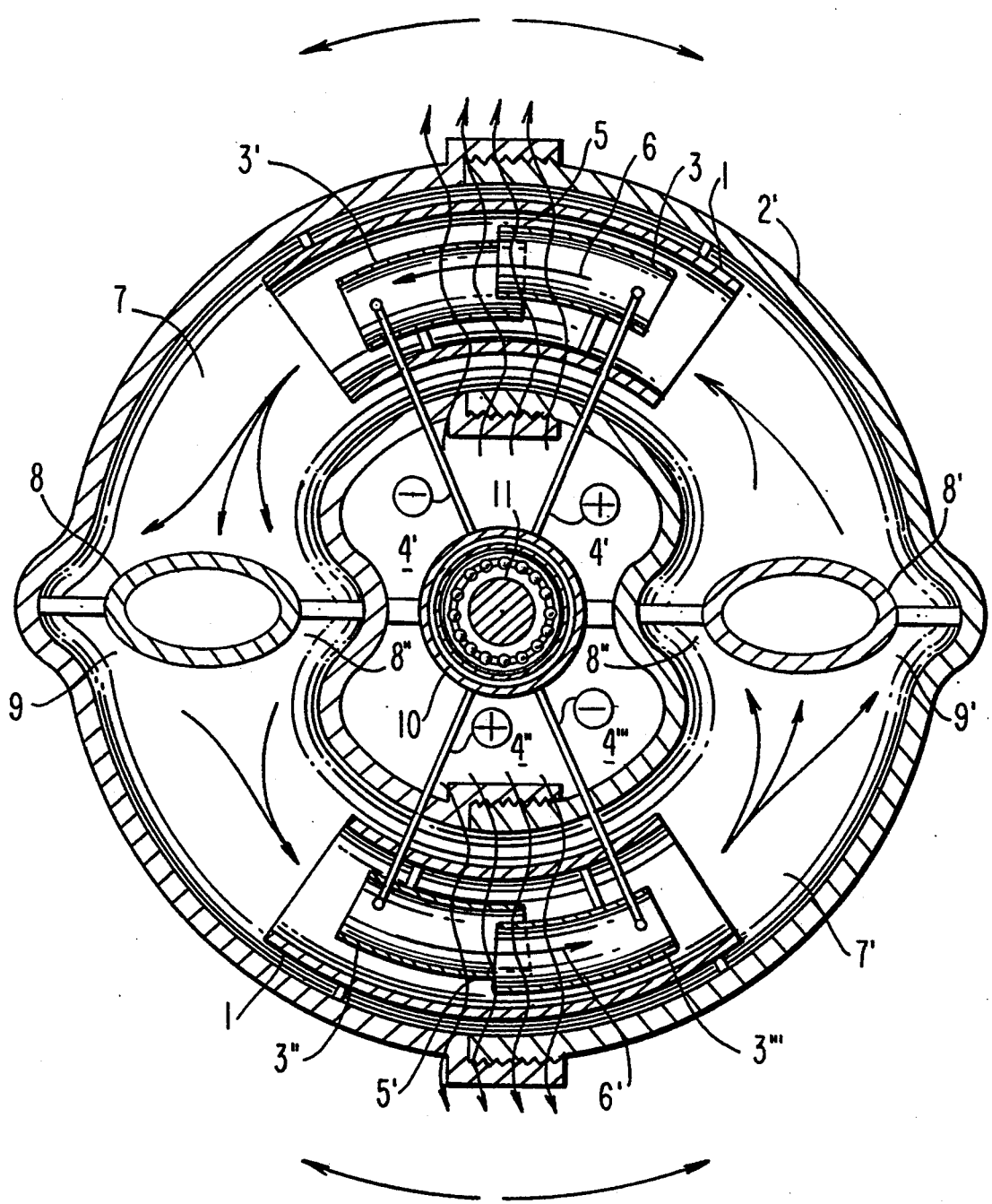
FIG. 1 is a view showing a cross-section of a propulsion system in accordance with the present invention.

A propulsion system shown in FIG. 1 has two magnetic field generating elements which are identified by reference numeral 1 and can be formed as superconductive magnets. The system has a housing including an inner housing part 2 and an outer housing part 2' which form therebetween a duct D. As can be seen from the drawings, the magnetic field generating elements 1 are located in the duct D at diametrically opposite locations. Two inserts 8 and 8' are located in the duct D at diametrically opposite locations and offset by 90° relative to the magnetic field generating elements 1. The inserts 8 and 8' are formed, for example, as disks having an elliptic hollow cross section. They are fixedly connected with the housing, for example by struts. The duct D includes first duct portions 5 and 5' located inside the magnetic field generating elements 1, further duct portions 7 and 7' located between the magnetic field generating elements 1 and the inserts 8 and 8', inner duct portions 8" located between the inner housing part 2 and the inserts 8 and 8', and outer duct portions 9,9' located between the inserts 8 and 8' and the outer housing part 2'.

The system further has two electrodes 3 and 3' arranged inside one magnetic field generating element 1 and two electrodes 3" and 3"' arranged inside the other magnetic field generating element. The electrodes 3 and 3' are connected to an electric source by conductors 4 and 4', while the electrodes 3" and 3"' are connected by conductors 4" and 4"' to the electric source. The electric current produced by the electrodes is substantially perpendicular to the magnetic field produced by the superconductive magnet and is identified by arrows 6 and 6'. The housing 2,2' is rotatably mounted on a shaft 11 with the interposition of a ball bearing 10. The above-specified ducts together form a closed duct system through which water can circulate without leaving the propulsion system.

During the operation the electric current producing element and the magnetic field producing elements are actuated, and as a result, the water is propelled through the duct system D so as to produce a thrust force applied to the inserts 8 and 8'. This thrust force is transmitted from the inserts to the housing 2,2' which is driven in rotation around the shaft 1. The housing, in turn, is connectable to any outside element so that the rotation of the housing produces a movement of the outside element as required.

Figure 2:
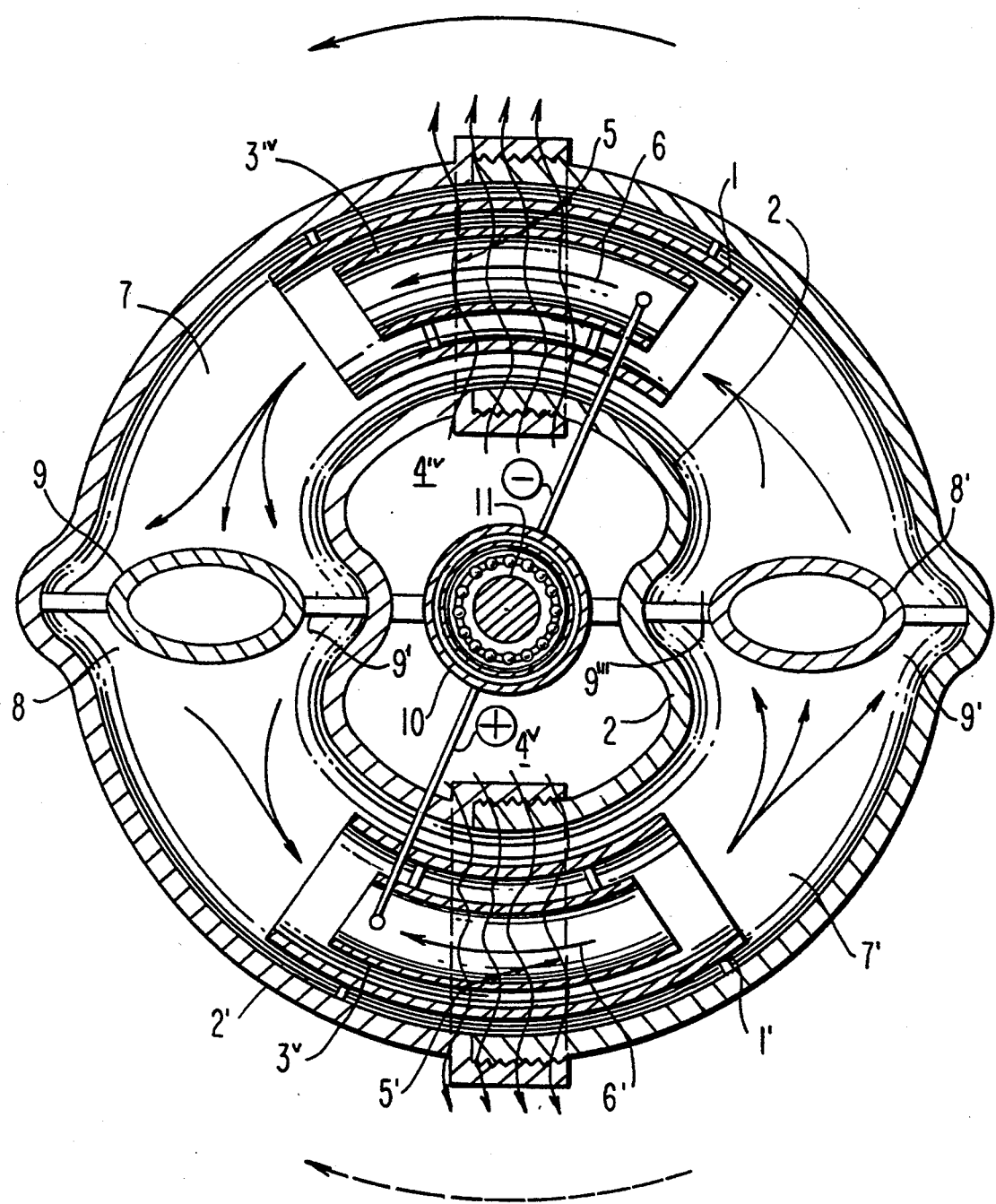
FIG. 2 is a view substantially corresponding to the view of FIG. 1 but showing a further embodiment of the inventive propulsion system.

The embodiment shown in FIG. 2 is substantially similar to the embodiment shown in FIG. 1 and the parts corresponding to the first embodiment are identified with the same reference numerals. The difference of the propulsion system in accordance with this second embodiment shown in FIG. 2 from the first embodiment shown in FIG. 1 is that the propulsion system has only two electrodes $3^{iv}$ and $3^v$ arranged at diametrically opposite locations of the duct system in the magnetic field generating elements 1. The electrodes $3^{iv}$ and $3^v$ are connected by conductors $4^{iv}$ and $4^v$ with the electric source while in the first embodiment the electric current is produced by the electrodes 4,4', 4'', 4''', in the embodiment of FIG. 2 the electric current is produced by the electrodes $4^{iv}$ and $4^v$.

Figure 3:
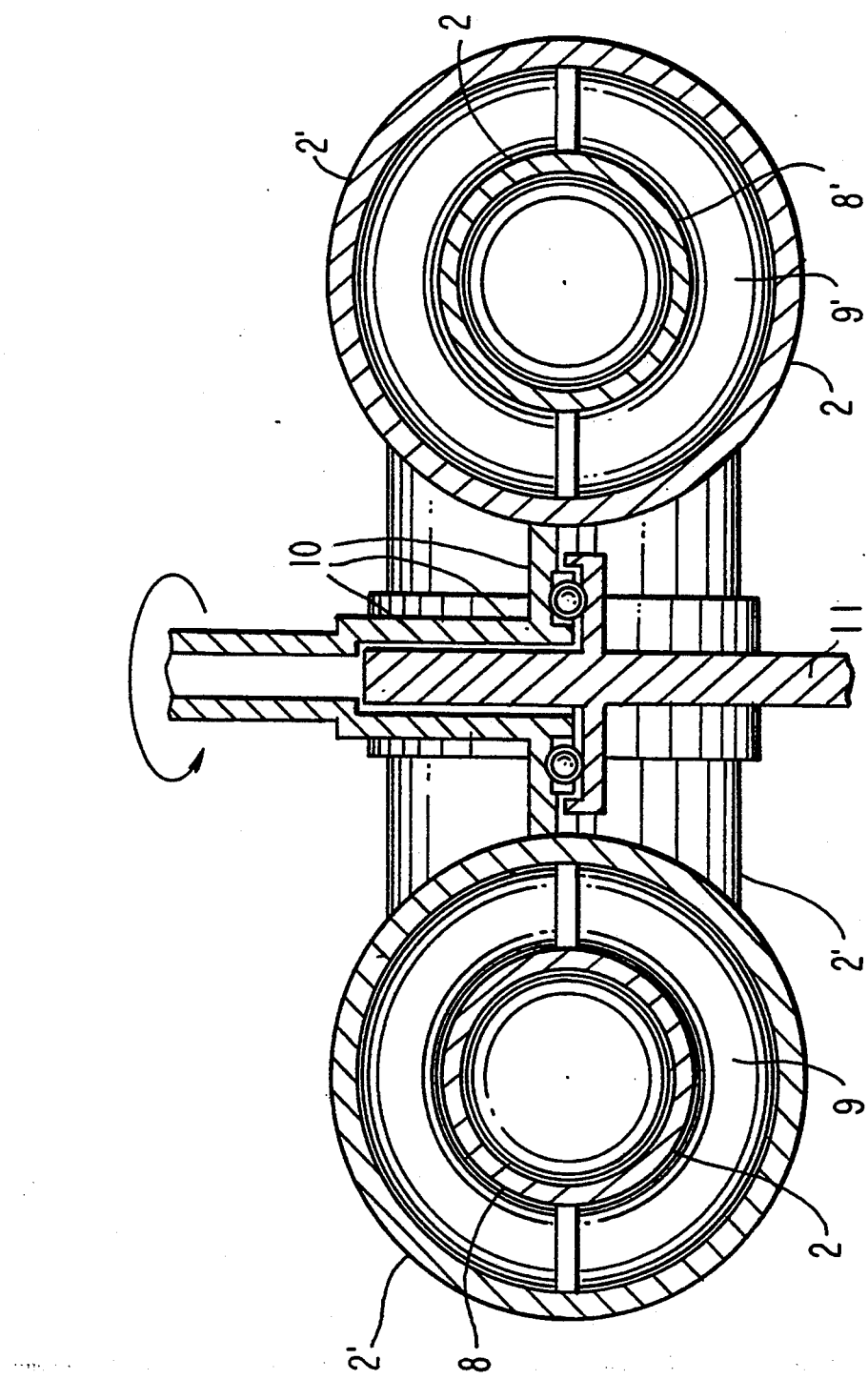
FIG. 3 is a section taken along the line III—III in FIG. 1 of the inventive propulsion system.
Figure 4:
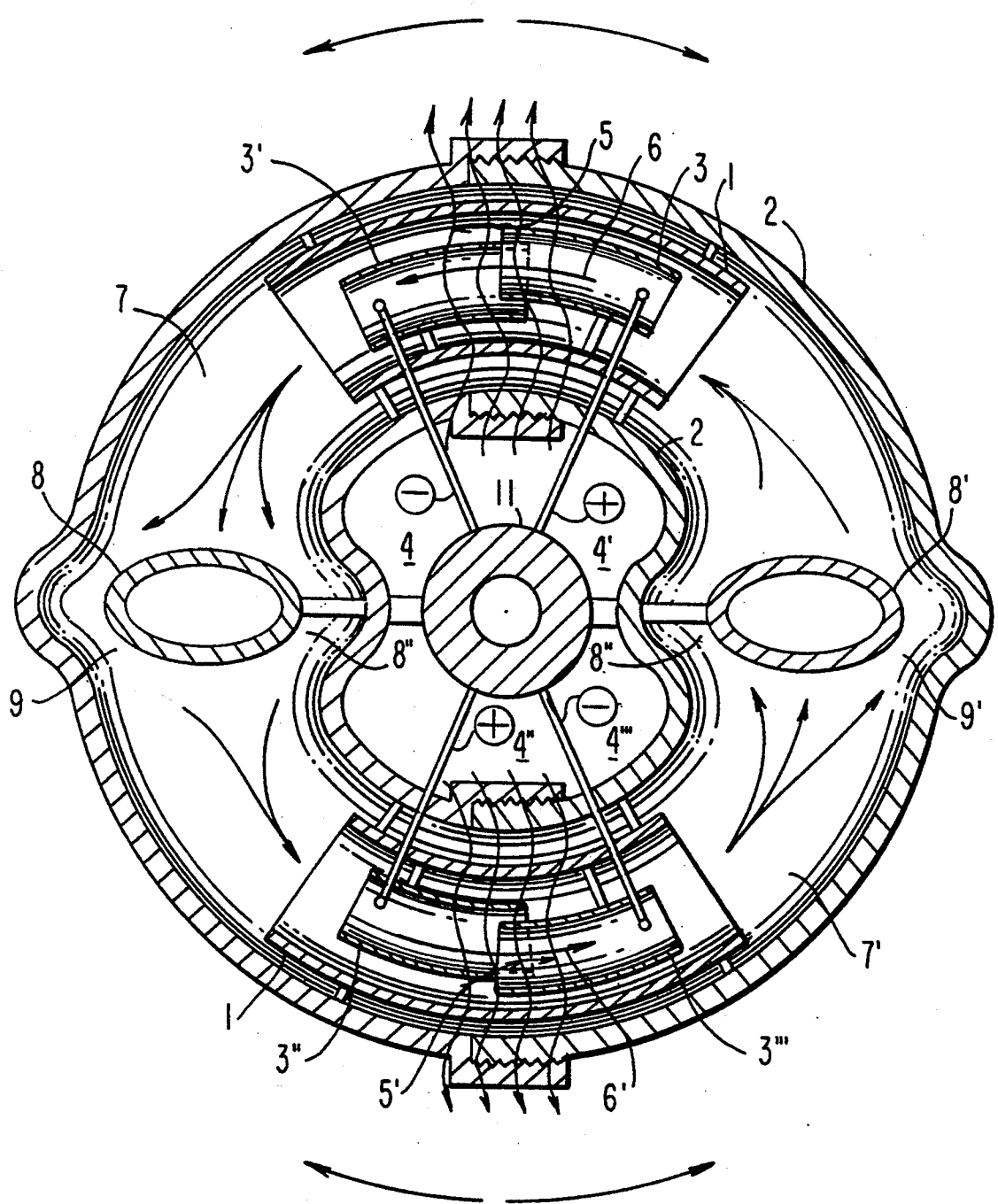
FIG. 4 is a view showing a further modification of the inventive propulsion system.

The propulsion system shown in FIG. 4 differs from the propulsion systems shown in the preceding Figures. While in the propulsion systems shown in FIGS. 1-3 the housing 2,2' is rotatable relative to the inner shaft 11, in the propulsion system shown in FIG. 4, the inner housing part 2' which is connected with the inserts 8,8' is also fixedly connected with the shaft 11'. However, the inserts 8,8' are not connected with the outer housing part 2. During the operation of the propulsion system, the water applies a thrust force to the inserts 8,8' and rotates them. This rotation is transmitted to the inner housing part 2' and to the shaft 1' which is rotated as a result of the same. An outside object to be driven is connectable with the shaft 11' and therefore obtains a driving force from the rotatable shaft, contrary to the previous embodiment in which the driving force is received by the outside object from the rotatable outer housing part 2.

As can be seen from the drawings, in the embodiment of FIG. 1, the inserts 8 and 8' are connected with the housing parts 2 and 2' so that the inserts are rotated under the action of the thrust force of water and in turn rotate the housing around the shaft 11. The magnetic field generating elements 1 and the electrodes 3-3''' are fixedly connected with the housing. In the embodiment of FIG. 4, the inserts 8 and 8' are fixedly connected with the inner housing part 2' and with the shaft 11', and therefore when the inserts are rotated by the water, they rotate the inner housing part and shaft. As shown in FIG. 4, the magnetic field generating elements 1 and the electrodes 3-3''' are fixedly connected with the inner housing part 2' and rotate together with the latter. On the other hand, they can be also fixedly connected with the immovable housing part 2. Similarly, in the embodiment of FIG. 1 the magnetic field generating elements 1 and the electrodes 3-3''' can be connected to the immovable structure of the system.

Figure 5:
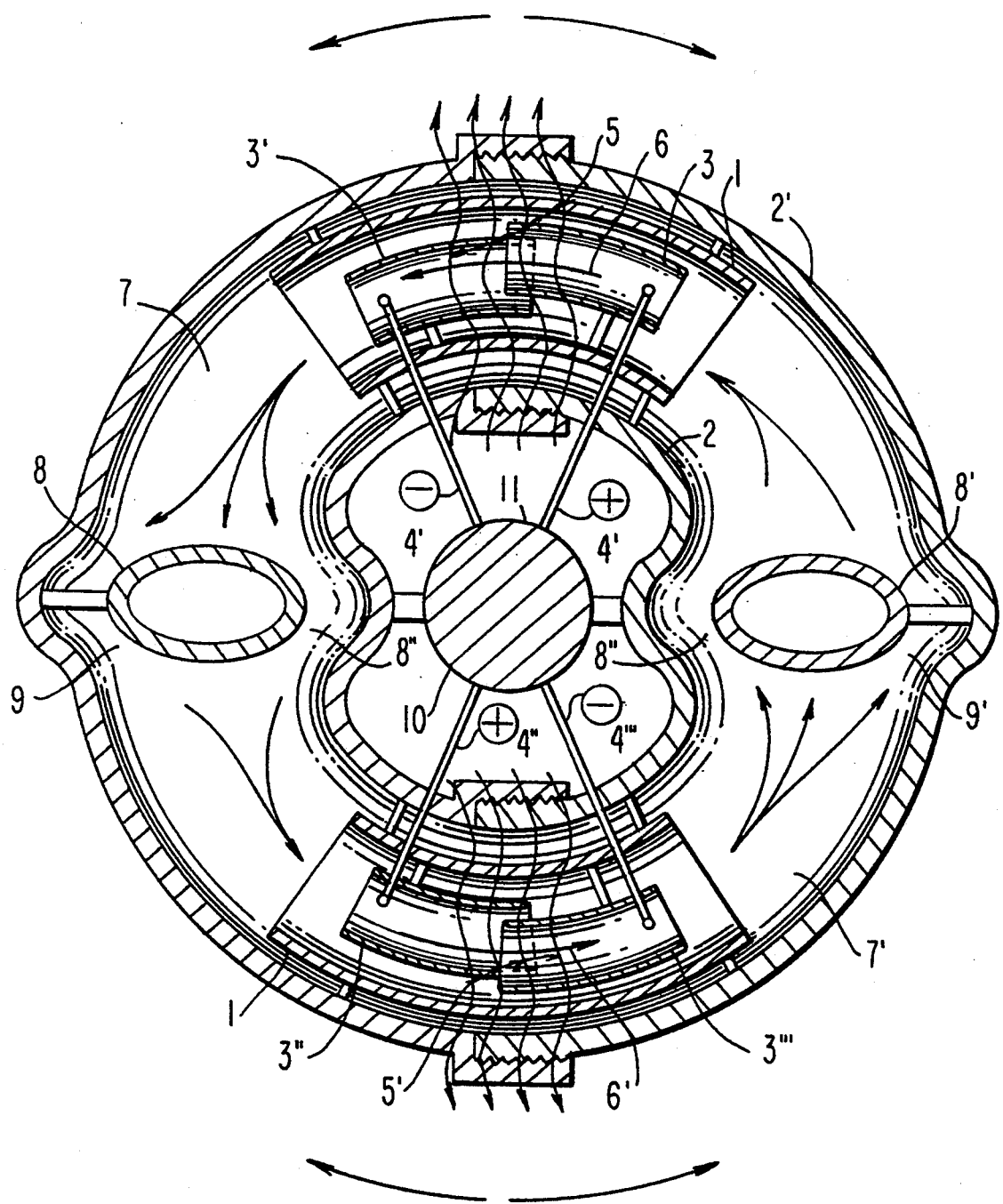
FIG. 5 is a view showing still a further modification of the inventive propulsion system.

In the embodiment of FIG. 5 the inserts 8 and 8' are connected only with the outer housing part 2', while the magnetic field generating elements, the electrodes, the inner housing part 2, and the shaft 11'' are fixedly connected with one another. Therefore, under the action of welter flowing through the duct, the inserts 8 and 8' are rotated and thereby the outer housing part 2' is rotated relative to the inner unit formed by the above-mentioned elements.

It will be understood that each of the elements described above, or two or more together, may also find a useful application in other types of constructions differing from the types described above.

While the invention has been illustrated and described as embodied in a propulsion system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A propulsion system, comprising a substantially tubular housing having an axis; means generating an electric current; means generating a magnetic field substantially perpendicular to the electric current; means forming a duct extending around said axis and arranged so that by interaction of the magnetic field and the electric current a force in a liquid accommodated in said duct is produced and the liquid is moved in said duct around said axis; and at least one insert located in said duct and fixedly connected to a part so that when the liquid is moved it applies a thrust against said insert in a direction around said axis so as to turn said insert and therefore said part around said axis to produce a rotary force which rotates said part around said axis, said insert being connected to said housing so that said insert together with said housing is rotatable about said axis.

2. A propulsion system as defined in claim 1, wherein said duct includes a duct portion located inside said means generating a magnetic field, a duct portion located between said housing and said insert, and a duct portion located between said insert and said means generating a magnetic field, following one another in a direction around said axis.

3. A propulsion system as defined in claim 1, wherein said housing includes an outer housing portion and an inner housing portion radially spaced from one another so as to form said duct therebetween, said insert being located between said outer housing portion and said inner housing portion.

4. A propulsion system as defined in claim 1, wherein said means generating a magnetic field includes two magnetic field generating elements located diametrically opposite to one another.

5. A propulsion system as defined in claim 1; and further comprising a further such insert, said inserts being located diametrically opposite to one another.

6. A propulsion system as defined in claim 4; and further comprising a further such insert, said inserts being located diametrically opposite to one another and offset relative to said magnetic field generating elements substantially by 90°.

7. A propulsion system as defined in claim 1; and further comprising a central shaft which forms said part so that said rotary force is transmitted to said central shaft and therefore said central shaft is rotated around said axis relative to said housing.

8. A propulsion system, comprising a substantially tubular housing having an axis; means generating an electric current; means generating a magnetic field substantially perpendicular to the electric current; means forming a duct extending around said axis and arranged so that by interaction of the magnetic field and the electric current a force in a liquid accommodated in said duct is produced and the liquid is moved in said duct around said axis; and at least one insert located in said duct and fixedly connected to a part so that when the liquid is moved it applies a thrust against said insert in a direction around said axis so as to turn said insert and therefore said part around said axis to produce a rotary force which rotates said part around said axis, said insert having an elliptical cross-section.

9. A propulsion system, comprising a substantially tubular housing having an axis; means generating an electric current; means generating a magnetic field substantially perpendicular to the electric current; means forming a duct extending around said axis and arranged so that by interaction of the magnetic field and the electric current a force in a liquid accommodated in said duct is produced and the liquid is moved in said duct around said axis; and at least one insert located in said duct and fixedly connected to a part so that when the liquid is moved it applies a thrust against said insert in a direction around said axis so as to turn said insert and therefore said part around said axis to produce a rotary force which rotates said part around said axis, said housing having an inner housing part and an outer housing part, said insert being connected only to said outer housing part so that said insert together with said outer housing part is rotatable relative to said inner housing part.

* * * * *